H. G. VOIGHT.
LOCK.
APPLICATION FILED JAN. 18, 1915.

1,235,615.

Patented Aug. 7, 1917.
9 SHEETS—SHEET 1.

WITNESSES:
F. A. Carlson
Mary E. Fuller

INVENTOR
H. G. Voight
BY
ATTORNEY

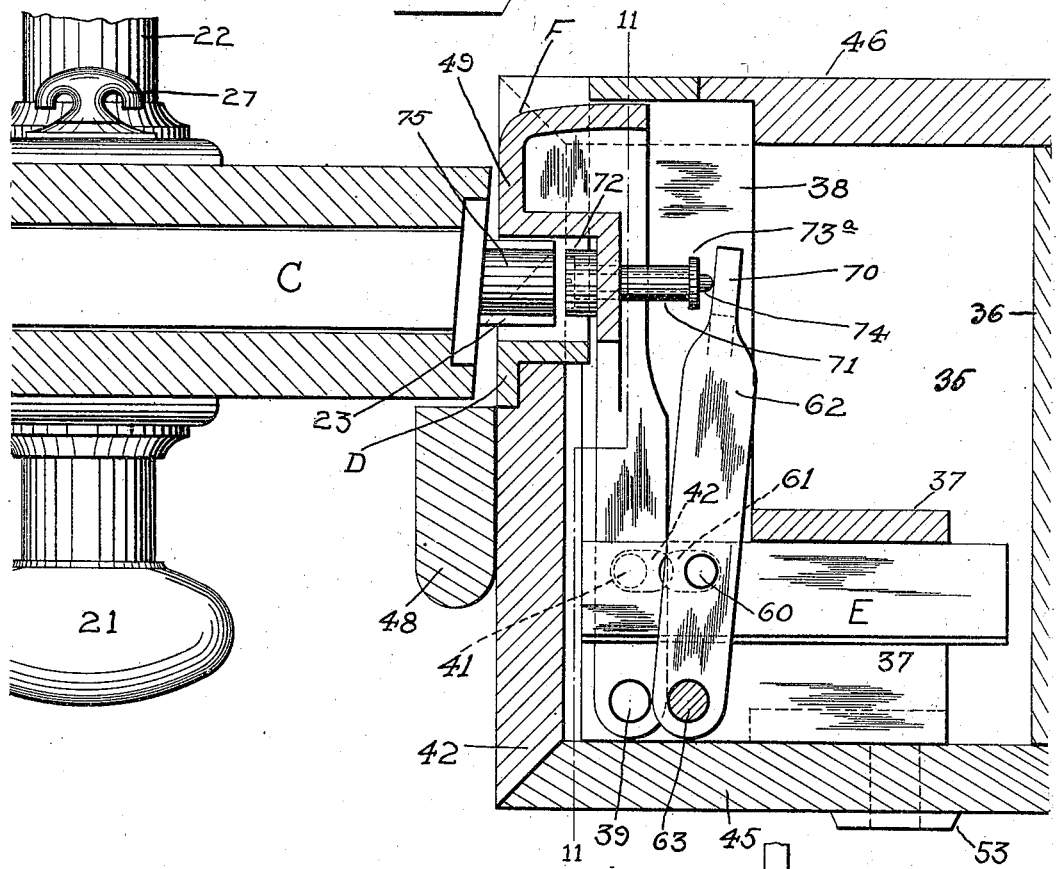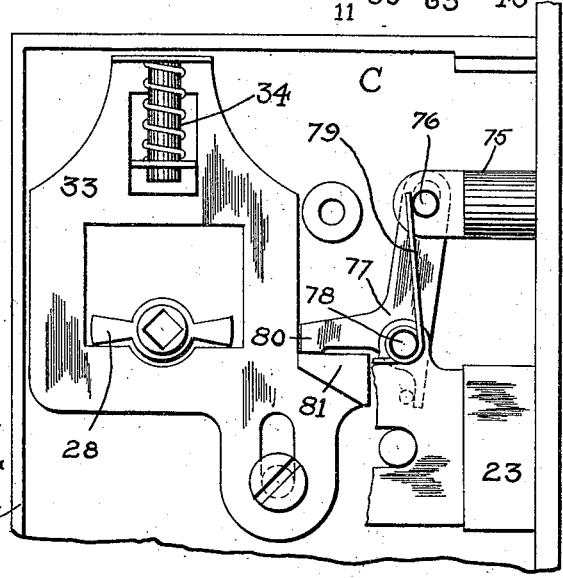

H. G. VOIGHT.
LOCK.
APPLICATION FILED JAN. 18, 1915.
1,235,615.
Patented Aug. 7, 1917.
9 SHEETS—SHEET 3.
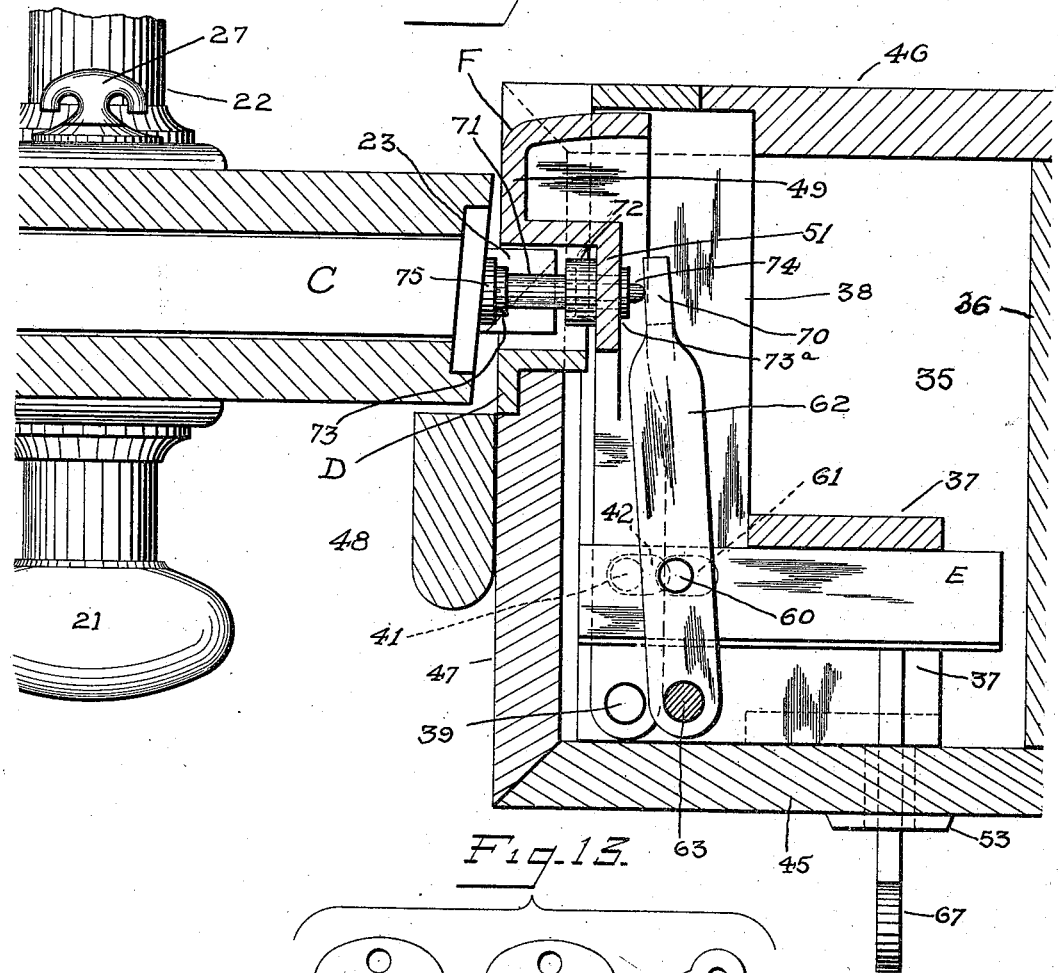
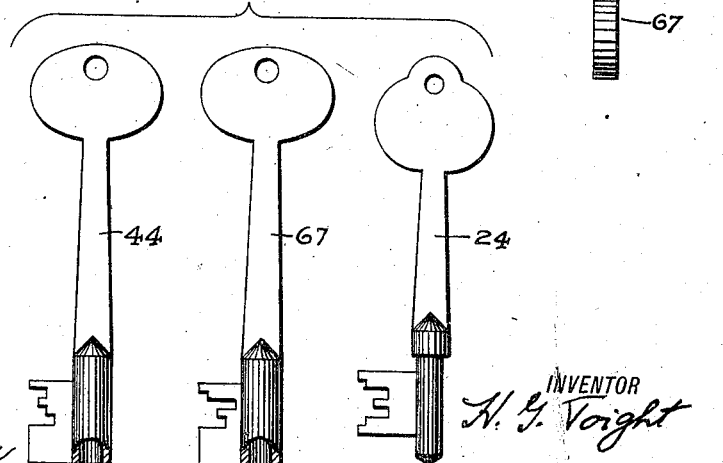
WITNESSES:
F. A. Carlson
Mary E. Fuller
INVENTOR
H. G. Voight
BY
ATTORNEY H. G. VOIGHT.
LOCK.
APPLICATION FILED JAN. 18, 1915.
1,235,615.
Patented Aug. 7, 1917.
9 SHEETS—SHEET 4.
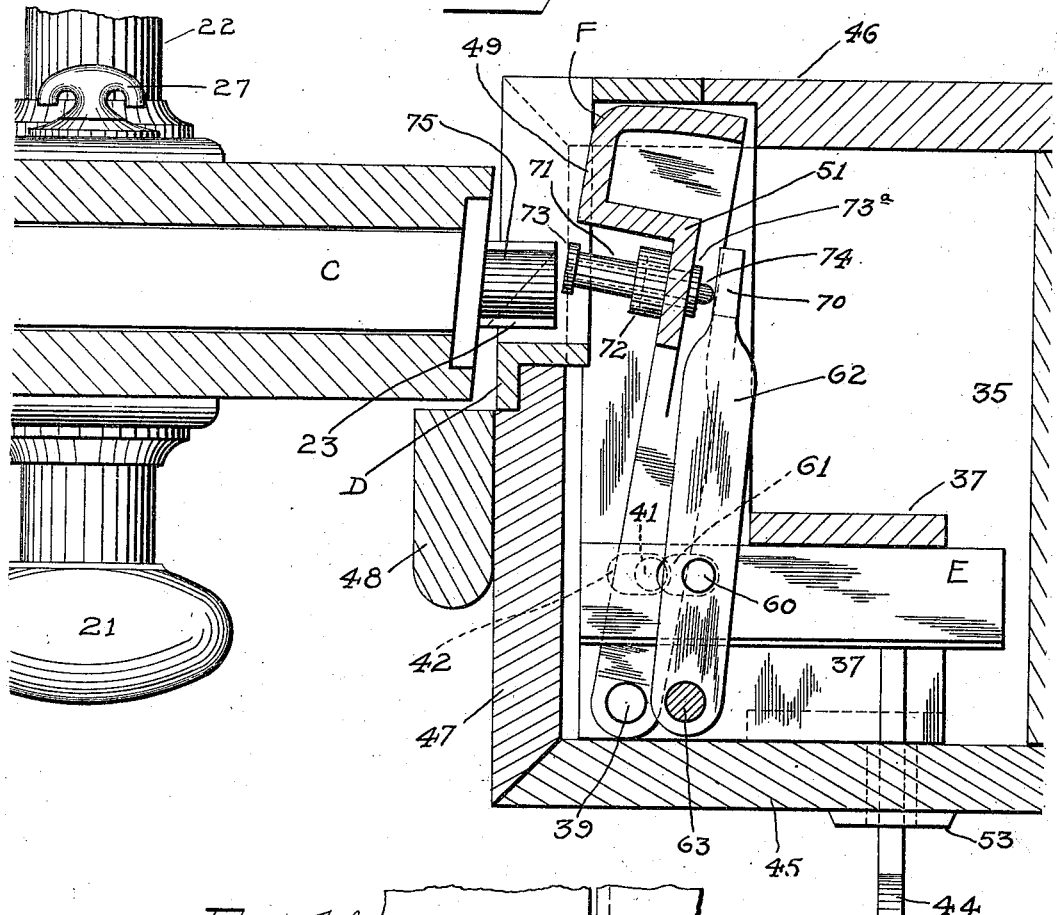
Fig. 4.
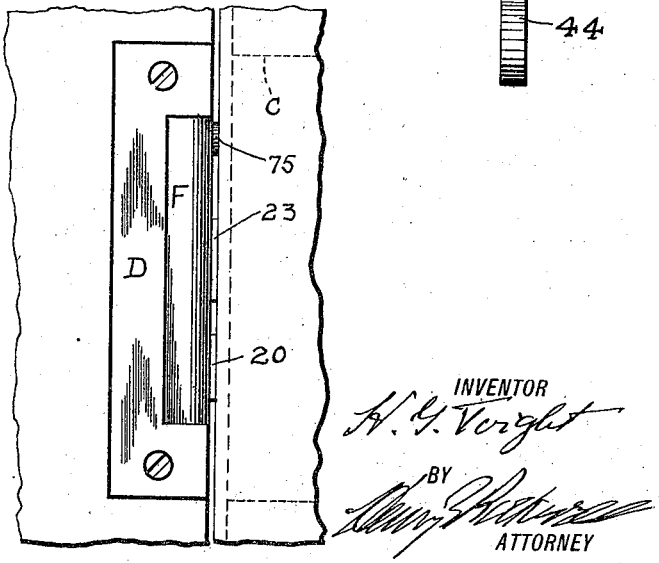
Fig. 4ᴬ.
WITNESSES:
F. A. Carlson
Mary E. Fuller
INVENTOR
H. G. Voight
BY
ATTORNEY

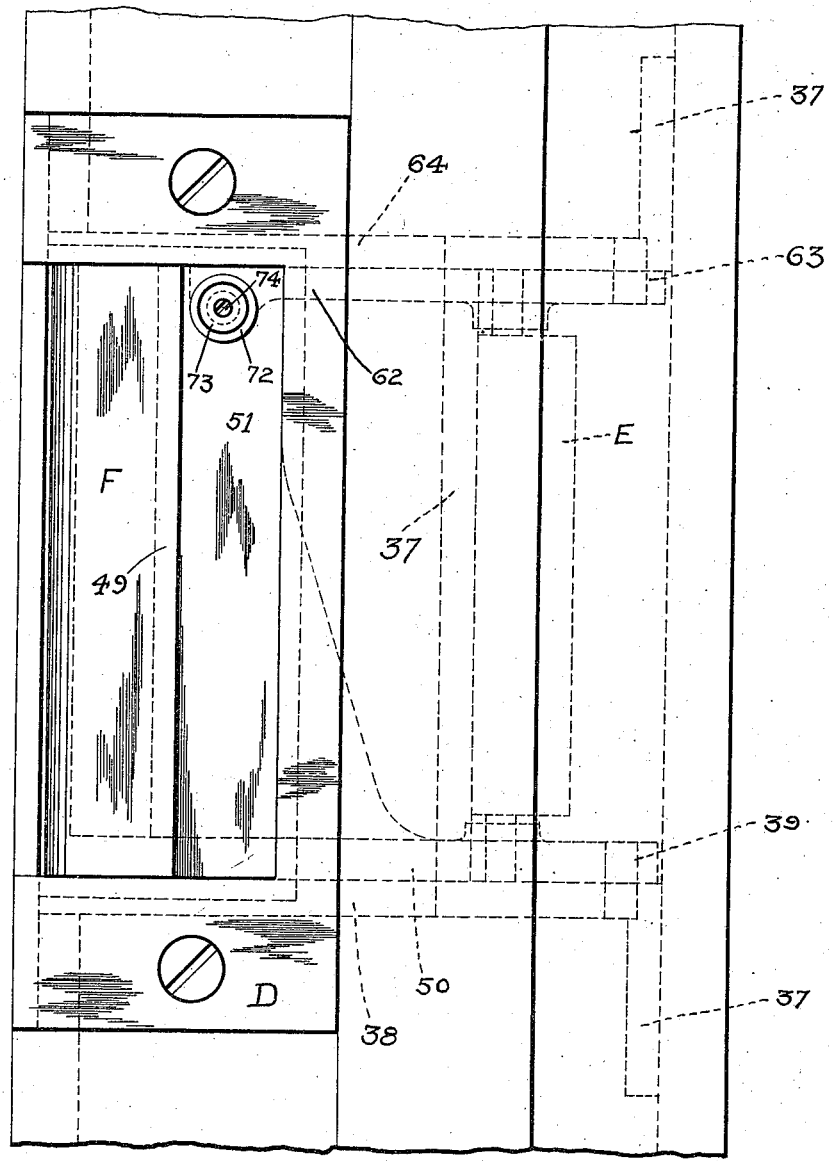

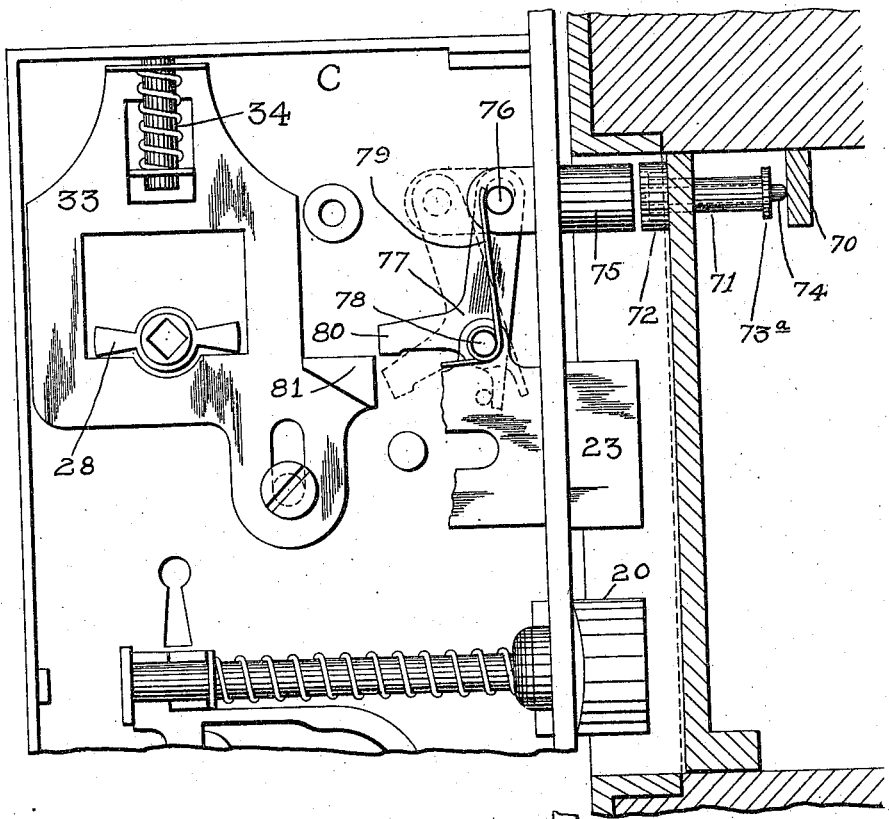
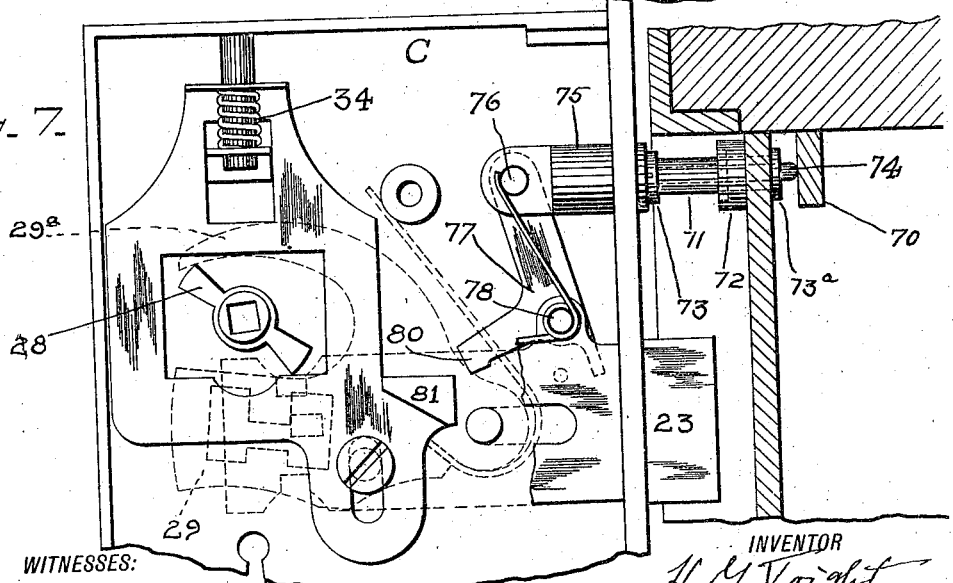

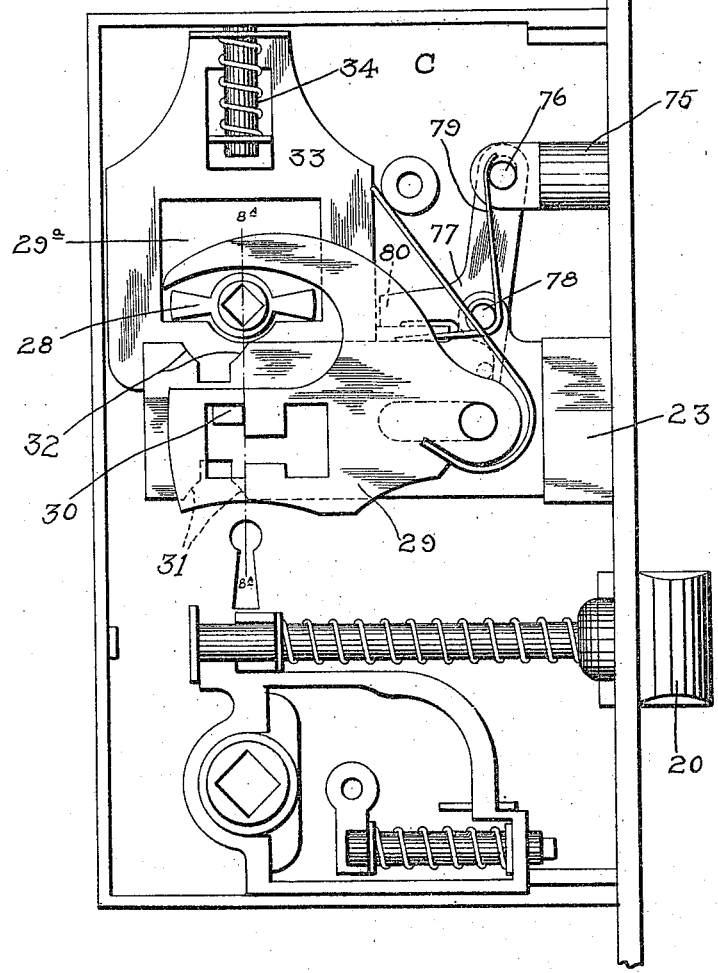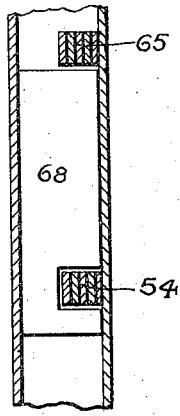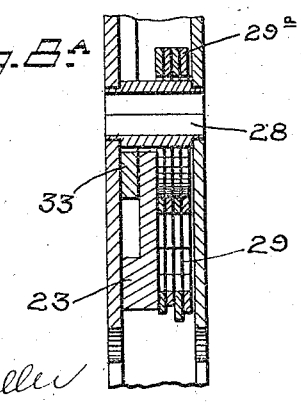

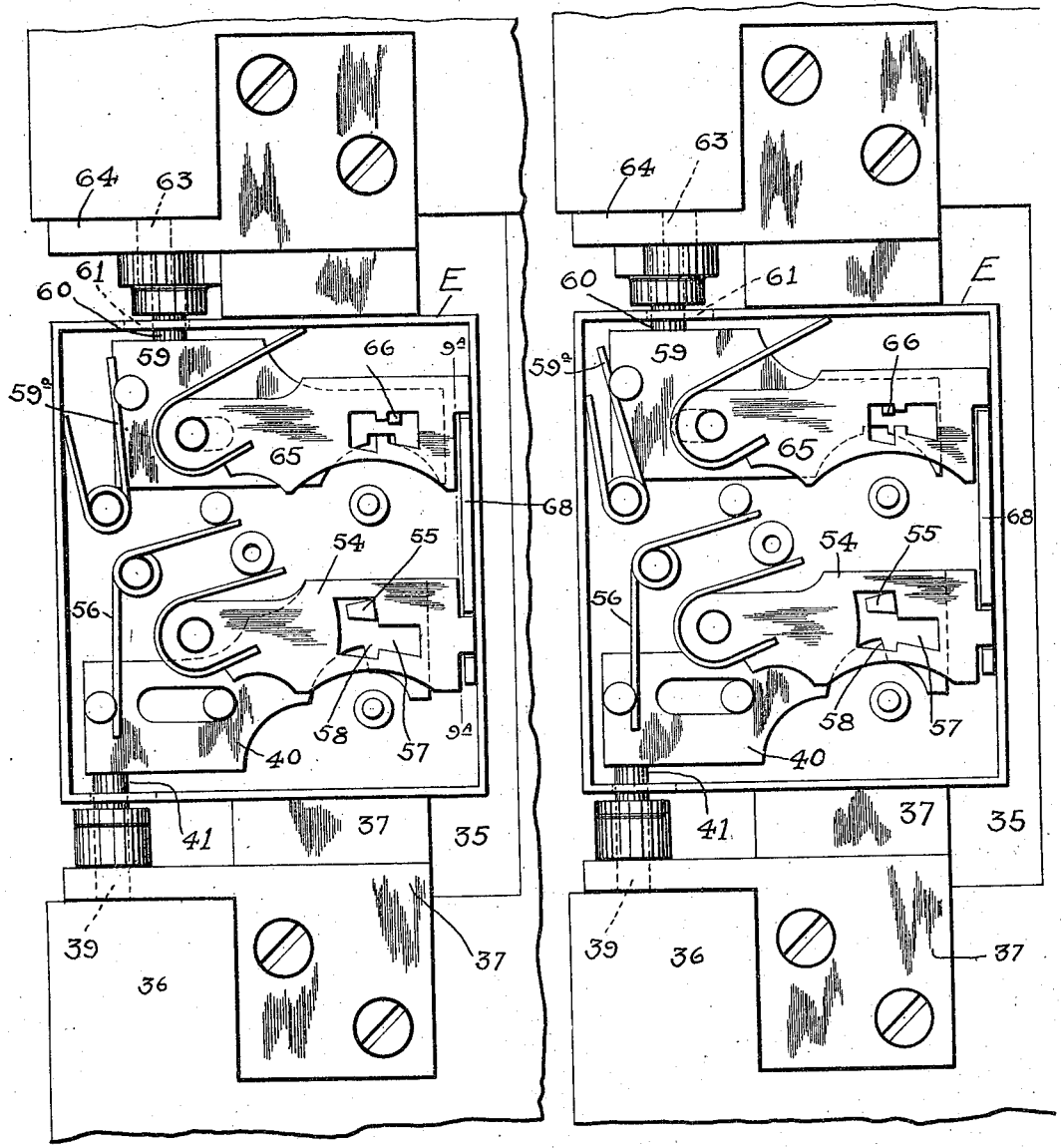

H. G. VOIGHT.
LOCK.
APPLICATION FILED JAN. 18, 1915.
1,235,615.
Patented Aug. 7, 1917.
9 SHEETS—SHEET 9.
Fig. 11.
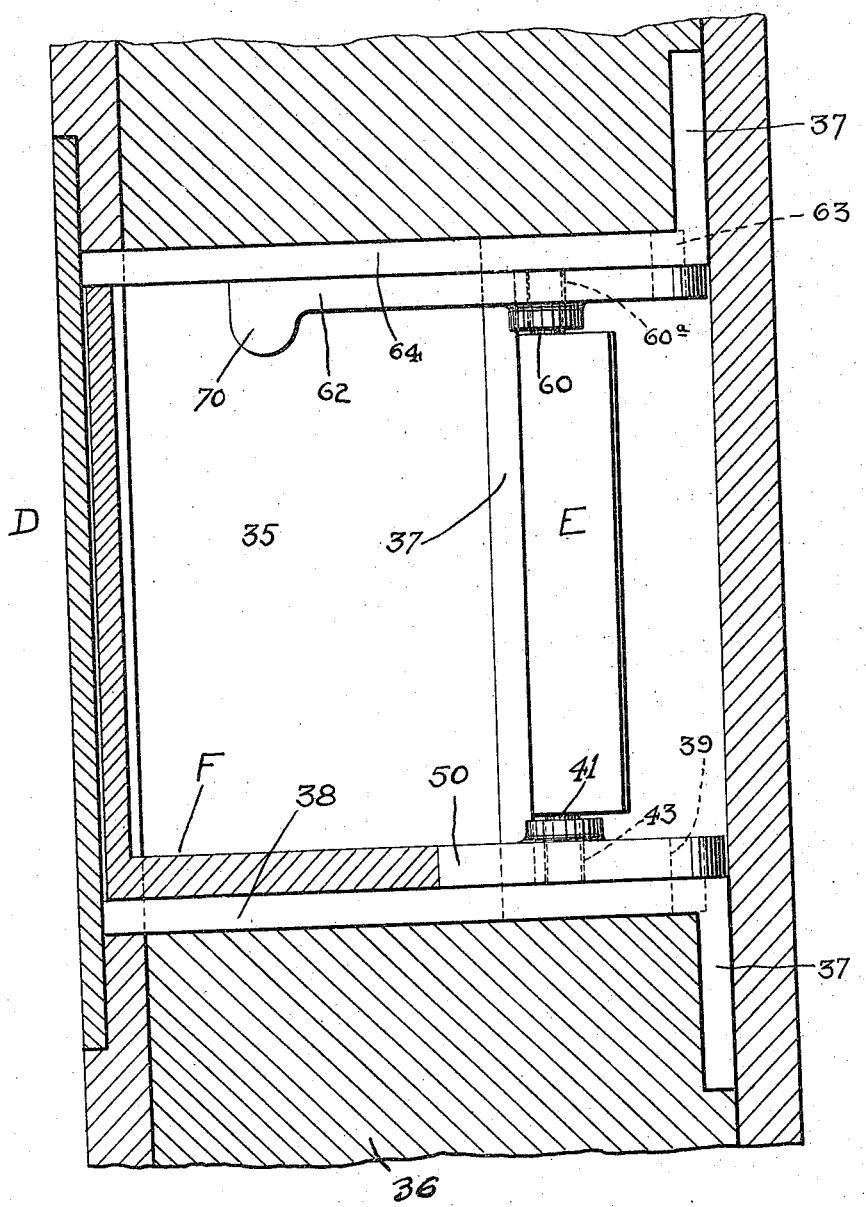
WITNESSES:
F. A. Carlson
Mary E. Fuller
INVENTOR
H. G. Voight
BY
ATTORNEY

UNITED STATES PATENT OFFICE.

HENRY G. VOIGHT, OF NEW BRITAIN, CONNECTICUT, ASSIGNOR TO SARGENT & COMPANY, OF NEW HAVEN, CONNECTICUT, A CORPORATION OF CONNECTICUT.

LOCK.

1,235,615.  Specification of Letters Patent.  Patented Aug. 7, 1917.

Application filed January 18, 1915. Serial No. 2,912.

*To all whom it may concern:*

Be it known that I, HENRY G. VOIGHT, a citizen of the United States, residing in New Britain, county of Hartford, and State of Connecticut, have invented certain new and useful Improvements in Locks, of which the following is a full, clear, and exact description.

This invention relates to locks, and more particularly to corridor door locks of hotels, although the invention is applicable to locks of other types.

For hotel use, a lock is required which can be opened at all times, and under all circumstances, by means of a special key known as an emergency key, which is usually kept in the possession of the proprietor or manager. Moreover, in addition to the ordinary guest keys or change keys, and other keys of low order, the locks of a hotel may usually be operated by what is known as a display key. This display key acts as a shut-out key, which locks the door so that it cannot be opened by the guest key, or other keys of low order, but it cannot prevent the opening of the door by the emergency key. Sometimes the emergency key also has the shut-out function, in which case it will lock the door in such a manner that it cannot be opened by any of the other keys, including the display key.

In the past, it has been customary for all of the various keys to act on a single group of tumblers, e. g., a series of pivoted tumblers, or a series of pin tumblers in a cylinder lock. Thus the lock construction, and more particularly the tumbler mechanism, becomes more and more complicated as the number of the functions of the lock is increased, and at the same time the security factor is decreased very considerably by the large number of tumbler changes required of a single group or series of tumblers. It has recently been proposed, however, to provide a lock construction in which these disadvantages are avoided, to the extent that the emergency key, or other master key for controlling the door, acts on a lock mechanism carried by, or housed in, the door frame or casing, and adapted to operate a movable door-releasing member coöperating with an ordinary lock on the door. The mechanism mounted on the casing or door frame constitutes, in effect, an emergency attachment for the lock on the door, and access to the room can be gained at all times by the proprietor, whose key will actuate the mechanism on the door frame in such a manner as to free the door and permit it to be opened merely by pushing or pulling on the same. By this arrangement, the change key and the emergency key have separate and distinct sets of tumblers so that the security factor is very largely increased as compared to the ordinary type of hotel lock.

One of the primary objects of the present invention is the application, to a lock system or construction of the kind indicated, of means providing for the shut-out, or display key function, so that mechanism on the door frame or casing can be actuated by a certain key in such a manner as to prevent the door from being opened from the outside by means of a key acting on the bolt which is carried by the door itself. In other words, it is aimed to provide a lock having a shut-out key which operates mechanism on the door frame or casing instead of on the door itself. This shut-out key will lock the door against the change key, which is adapted to operate the bolt on the door.

Another object which I have in view is to furnish a lock construction in which the door is provided with a bolt, and the door frame is equipped with means for releasing the bolted connection of the door and frame when said bolt is in protracted position, and for preventing the release of such bolted connection by the withdrawal of said bolt from one side of the door. More specifically, my object is to provide a lock construction in which the door frame or casing is provided with means actuated by a shut-out key to lock the door against opening by a key fitted to the bolt on the door, and also with means actuated by an emergency key to unlock the door when locked by said first means. Ordinarily the change key, shut-out (display) key, and emergency key will each have its own special set of tumblers which is never actuated by any other key of the series, whereby the very greatest security is provided. This arises from the fact that the bolts or other devices controlled by the respective sets of tumblers can be very effectively guarded against picking by tumbler sets, each of which is adapted to be operated by one key only, and because the several change keys may readily be so differentiated from each other and from the master keys that each key will perform only its intended function. In other words, the possibility that a key will operate a lock which it is not intended to operate is reduced to a minimum.

Other objects of the invention are to provide means operable from the door frame or casing to release a door locked by means of a dead bolt and latch bolt carried by the door, and coöperating with a strike on the door frame; to provide means operable from the door frame or casing for preventing the withdrawal, from the outside of the door, of a bolt carried by the door and projected into a strike on the door frame; to furnish means operable from the inside of the door for releasing the door when it has been locked from the outside by means of a shut-out key, coöperating with the shut-out mechanism on the door frame, so that the guest cannot be locked in his room; and to improve the general construction and operation of devices of the class to which my invention relates.

To these and other ends, the invention consists in the novel features and combinations of parts to be hereinafter described and claimed.

In the accompanying drawings,

Fig. 2 is a section on the irregular section line 2—2 of Fig. 1, but showing the door locked by the dead bolt carried thereby.

Fig. 3 is a view similar to Fig. 2, showing the operation of the shut-out key to prevent the door from being opened from the outside by means of the change key or guest key.

Fig. 4 is a similar view, showing how the door is released by the emergency key from the outside, after being locked by the shut-out, or display key.

Figure 1:
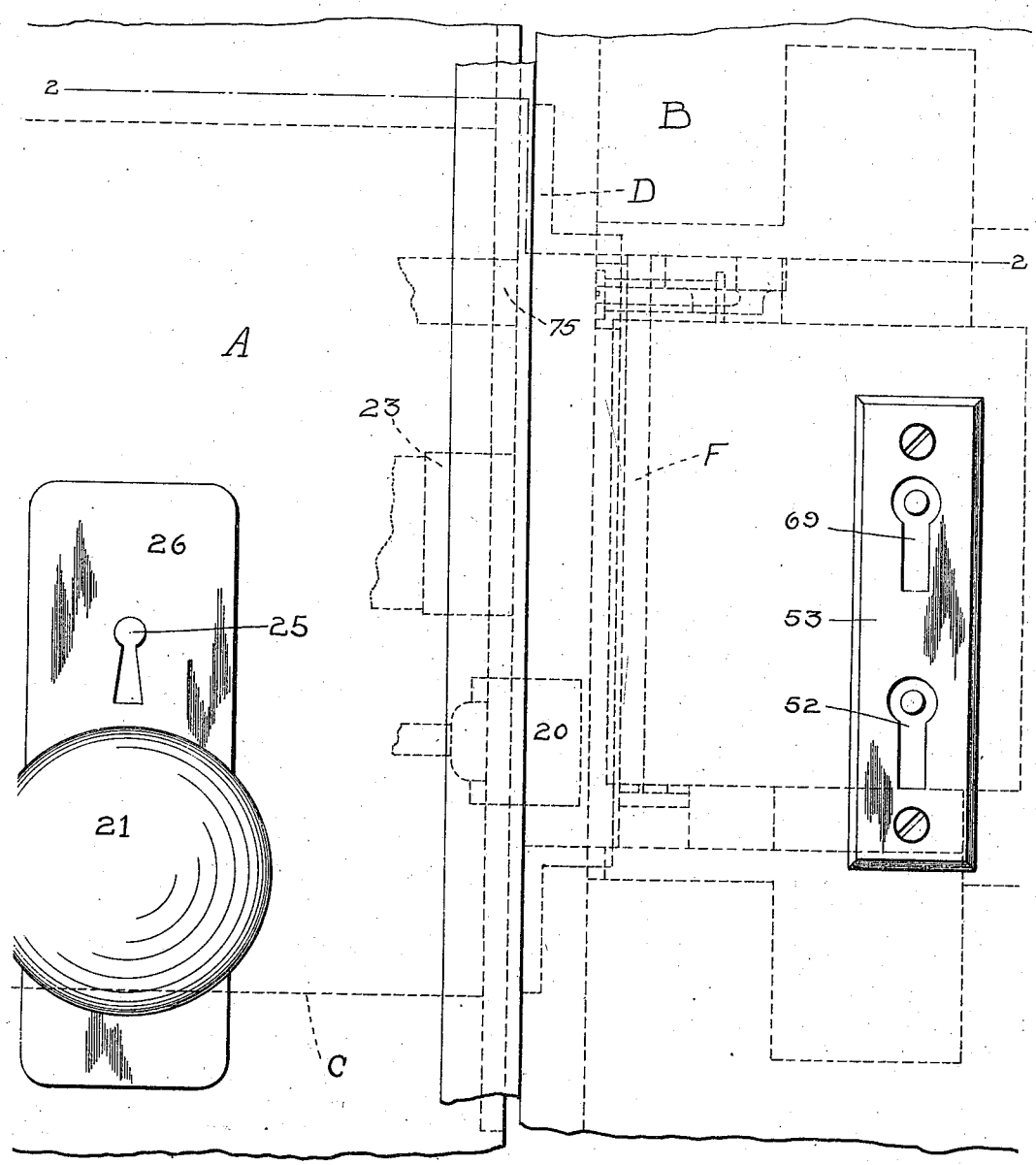
Figure 1 is a fragmentary outside elevation of a door and door casing equipped with my improvements, the door being unlocked.

Fig. 4ª is a fragmentary view on a smaller scale of the lock mechanism, looking from the inside of the room.

Fig. 5 is a fragmentary view of the door casing, looking toward the face of the strike.

Fig. 6 is an elevation, partly in vertical section, of the lock on the door, and the strike, with the parts in the positions shown in Fig. 2.

Fig. 7 is a view similar to Fig. 6, but showing the commencement of the operation of withdrawing the dead bolt from the inside of the door, after it has been locked in its projected position by actuation of the shut-out key.

Fig. 8 is an elevation of the main lock, or lock on the door, with the cap plate removed.

Fig. 8ª is a section on line 8ª—8ª of Fig. 8.

Fig. 9 is an elevation of the auxiliary lock, or lock on the frame, with the cap plate removed, the parts being in the position corresponding to Fig. 2.

Fig. 9ª is a section on line 9ª—9ª of Fig. 9.

Fig. 10 is a view similar to Fig. 9, showing the parts in the position corresponding to Fig. 3.

Fig. 11 is a section on line 11—11 of Fig. 2.

Fig. 12 is a detail of the upper part of the main lock, with the dead bolt broken away, showing said bolt in its retracted position, and Fig. 13 comprises detail views of the several keys.

In the particular embodiment of my invention which I have selected for illustration, the door is provided with a mortise lock having a latch bolt and a dead bolt. The latch bolt is adapted to be retracted by outside and inside knobs respectively attached to the ends of a single spindle. The dead bolt is adapted to be actuated by a key at the outside, and by a thumb knob at the inside. The casing or frame of the door is provided with a strike plate having a part which may be moved to release both bolts by the actuation of an appropriate key called an emergency key that operates an auxiliary or emergency lock, associated with the door frame and controlling the movable part of the strike. It will thus be seen that when the door is locked by protracting the dead bolt, either from the outside or from the inside, the possessor of the emergency key may readily open the door by drawing back the movable strike member out of coöperation with the dead bolt and latch bolt so as to gain access to the room, in case of emergency or accident. Furthermore, the auxiliary lock, associated with the door frame or casing, is provided with means coöperating with the main lock and adapted to be actuated by a certain key, termed a shut-out or display key, to prevent the retraction of the dead bolt from the outside of the door by means of its key, under certain circumstances, for example, when it is desired to lock out a guest who does not pay his hotel bill. All of the features spoken of above are not essential parts of my invention in all of its aspects, but they are mentioned to facilitate an understanding of the following description of the particular construction illustrated.

Referring to the drawings, A denotes the door, B the door frame or casing, C the lock on the door, D the strike on the casing, E the auxiliary lock associated with the casing, and F the movable part of the strike D controlled by a part of the lock mechanism E. The lock C is illustrated of the mortise type, but this is unessential. It has a latch bolt 20 adapted to be retracted by an outside knob 21, and an inside knob 22 connected with the usual spindle and retracting mechanism, but the particular means for retracting the latch bolt is also unessential. The lock C is likewise provided with a dead bolt 23 adapted to be actuated from the outside of the room by a key 24 (Fig. 13), hereinafter referred to as the guest key or change key, said key being insertible into the lock C, through a keyhole 25, in an escutcheon 26 on the outer face of the door. The dead bolt 23 may be actuated from the inside of the room by means of a thumb turn knob 27 connected with a winged hub 28. The bolt 23 is provided with a series of pivoted tumblers 29 (Fig. 8), coöperating with the fence or stump 30 on the bolt in the usual manner, and overlying the talons 31, at the lower part of the bolt shank, which are engaged by the key. The thumb turn hub is provided with diametrically arranged wings adapted to engage talons 32 on the upper part of the bolt shank, and the tumblers 29 are provided with extensions 29ª extending over the hub so that when it is desired to actuate the bolt from the inside of the door, the tumblers 29, by engagement with one wing of the thumb turn hub, will be raised to clear the fence, while the other wing of said hub engages the talons 32 to protract or withdraw the bolt. The hub 28 is normally held with its wings in the horizontally disposed inoperative position shown in Fig. 8, by means of a spring-pressed yoke or slide 33 having portions engaging both the hub wings from beneath, as shown. When the bolt is to be actuated by the thumb turn member, however, one of the hub wings can press down the yoke 33 in opposition to the spring 34 acting on the yoke, as will be understood.

Located in a suitable notch 35 in the stud 36 of the door frame is a U-shaped bracket 37, the ends of which are suitably secured to the stud. This bracket 37 forms a support or mounting for the auxiliary lock E, which is fitted within the intermediate part of the bracket, as shown in Fig. 11, and suitably secured to the bracket in such a position as to lie wholly within the notch or other cut-away part in the stud. At its lower part, the bracket is provided with an extension 38, which may extend completely across the notch in the stud, as shown for example in Fig. 2, and which serves as a carrier or mounting for the movable member F of the strike. Preferably, the member F is of the pivoted type, being pivoted or swiveled to the extension 38 by means of a pivot pin 39 at a point below the auxiliary lock E. The lock E is provided with a bolt 40, which carries a depending pin 41, extending out of the lock case through a slot 42 in the bottom thereof, and engaging an opening or socket 43 in the movable strike member F. Thus, said movable strike member being pivoted to the bracket at 39, and being operatively connected with the bolt 40, will assume a locking position with respect to the latch bolt 20 and dead bolt 23, when the bolt 40 is in the position shown in Fig. 9, and will assume a releasing position with respect to said bolts when the bolt 40 of the auxiliary lock is moved to the right with reference to Fig. 9 by means of a key 44 (Fig. 13) termed the emergency key. In other words, the bolt 40 of the auxiliary lock is adapted to hold the member F in locking position with respect to the latch bolt and dead bolt of the lock on the door, but when the bolt 40 is moved by the emergency key the member F will be withdrawn from the locking position shown in Fig. 2 to the unlocking position shown in Fig. 4, so that the door may be opened from the outside merely by pushing on the same.

The auxiliary lock E, as previously stated, is located within a notch in the stud so that when the covering or casing members of the door frame are applied, it will be securely housed in the interior of the casing. Under some circumstances, however, the auxiliary lock might be applied to the exterior of the casing. The outer casing member is shown at 45, the inner casing member at 46, the intermediate casing member at 47, and the stop bead on the casing member 47, at 48. Preferably, the upper and lower ends of the U-shaped bracket 37 will be mortised in the outer face of the stud, as shown in Fig. 11, so that the outer casing member may then be applied in the usual manner. The strike D, which is mortised in the casing member 47, is cut away at its inner edge to provide a space in which operates a catch portion or lip of the movable member F. This movable member may advantageously take the form indicated in Fig. 5, having a flat shank 50 adapted to lie and be guided on the extension or plate 38, and having a comparatively long upwardly extending lip or catch portion 49 to contact with the latch bolt and dead bolt. Between the lip or catch portion 49 and the pivoted extremity of the strike member is a flat portion 51 adapted to be positioned back of the opening in the fixed part of the strike, as shown in Fig. 5.

A keyhole 52 for the emergency key 44 passes through the outside casing member 45, and through a small escutcheon 53 applied to said casing member. When the emergency key is introduced into the lock E, and turned in the proper direction, it releases a plurality of tumblers 54 from engagement with the stump or fence 55 on the bolt 40 and retracts said bolt, thereby withdrawing the movable part of the strike. The bolt 40 is normally held in its forward position, corresponding to the locking position of the strike member F, by means of a spring 56. As the bolt is retracted, the fence 55 passes into notches 57 of the tumbler gatings, and immediately upon the release of the key, the bolt will spring forward to its initial position, thereby returning the member F to the operative or locking position. The emergency key 44 is preferably of the drill pin type, as shown, and the key bit is prevented from making a full rotation in the key-hole by abutting a shoulder 58 on the bolt, so that the key cannot be turned to a position in which the bolt is jammed back to release the movable strike member. In other words, the movable strike member cannot be held back without holding on the key controlling the same.

Referring now to the shut-out or display feature, whereby the door may be locked against entrance of the person possessing the guest or change key 24, it has been previously indicated that in the construction illustrated, this mechanism has certain parts embodied in the auxiliary lock E. In other words, in the example shown, the case of the lock E contains a device forming a part of the emergency key mechanism, and another device forming a part of the shut-out mechanism. However, it will be understood that in the broad aspects of the invention this arrangement is unessential. In the form shown, the casing of the lock E contains a bolt 59 located above the bolt 40, and carrying a stud 60 projecting upward out of the lock case, through a slot 61, and operatively connected with a controlling member 62. The stud 60 preferably engages a hole or socket 60ª in the member 62, which in the form shown, is constituted by a lever pivoted by means of a post or stud 63 to the plate or extension 64 on the bracket 37. The plate or extension 64 is on the upper part of the bracket and is similar to the part 38 at the lower portion of the bracket. The bolt 59 is provided with a plurality of tumblers 65 coöperating with the stump or fence 66, and the gatings of the tumblers are so arranged that the bolt 59 may be deadlocked either in the retracted position shown in Fig. 9, or the advanced position shown in Fig. 10. This bolt is adapted to be actuated by a shut-out or display key 67 (Fig. 13) which may advantageously be of the drill pin type, like the emergency key. The tumblers 65 are adapted to be lifted and released by a tumbler slide 68, actuated by the tumblers 54 of the bolt 40, for the purpose hereinafter described. A keyhole 69 for the shut-out key 67 passes through the escutcheon 53 and through the casing member 45 above the keyhole 52.

In the form shown, the lever 62, actuated by the bolt 59, is adapted to act on a plunger associated with the movable part F of the strike, and said plunger is adapted to lock the door against opening from the outside by means of the change key. In the example illustrated, this plunger is adapted to actuate mechanism for dogging the dead bolt 23 against movement by its key 24. To these ends, the construction may be substantially as follows: The free extremity of the lever 62 is provided with an enlargement 70 adapted to engage a sliding plunger 71 mounted in the upper portion of the member F. A hole is bored through the flat part 51 of the part F, and extending forwardly from said hole is a sleeve 72, which, in conjunction with said hole, forms a guide for the plunger. The plunger is provided with a head 73 at the front, or outer end, and in the inoperative position of the plunger (Fig. 2), the head 73 is withdrawn in a counter-bore in the sleeve 72. The abutting of the head 73 against the sleeve 72 limits the movement of the plunger in a rearward direction, i. e., away from the door, and movement of the plunger in the opposite direction is limited by a similar head 73ª on the rear end of the plunger adapted to abut the rear surface of the movable strike member. A screw 74 passes completely through the plunger 71 in a lengthwise direction, and contacts at its rear end with the flat coöperating portion 70 of the lever 62. The screw 74 is provided with a nicked head, accessible from the face of the strike, so that by screwing it in or out the throw of the plunger relative to the strike member may be suitably adjusted to a certain extent. The head 71 of the plunger is adapted to abut the head of a small bolt 75 forming a part of the lock C. This bolt 75 may be termed a controller, and is illustrated as being adapted to slide in a suitable opening in the face or front of the lock C above the dead bolt 23. At its rear extremity, the controller 75 is pivoted by means of a pin 76 to a dogging lever 77, which in turn is pivoted on the dead bolt 23 by a pin 78. Thus the controller bolt 75 is carried by the dead bolt. A spring 79 normally presses the controller bolt in an outward direction, and in the case illustrated, the outer face of the controller bolt head is normally located in substantially the same plane as the outer face of the dead bolt head, so that when the dead bolt is projected outward beyond the face plate, the controller bolt is projected from the face plate to approximately the same extent. The upwardly extending arm of the lever 77 serves as a carrier for the controller bolt, and the rearwardly extending arm of said lever serves as a member for dogging the dead bolt when the controller bolt 75 is pushed inward by the plunger 71. To this end, the rear extremity 80 of lever 77 coöperates with a fence or lug 81 in the casing in such a manner that when the dead bolt is projected and the controller bolt is forced back by the plunger, the extremity 80 will be moved down in front of the fence 81, so as to deadlock the dead bolt in its protracted position. This will obviously prevent the dead bolt from being retracted from the outside of the door by means of its key 24. On the other hand, when the plunger is withdrawn from contact with the controller bolt 75, the spring 79 will return the controller bolt to its initial position, and at the same time will raise the extremity 80 of lever 77 out of coöperation with the fence 81, so that thereupon the guest key 24 will at once be operative to withdraw the dead bolt. In order that the dead bolt may not be deadlocked against retraction from the inside by the thumb turn, however, the fence 81 is carried by the yoke 33, associated with the thumb turn hub 28. Hence, in manipulating the thumb turn hub, the fence 81 will be carried downward with the yoke, out of coöperation with the lever 77, on the initial movement of the thumb turn hub, as indicated in Fig. 7, so as to allow the bolt to be withdrawn by the thumb turn member. The key, however, cannot retract the bolt, under these circumstances, because, unlike the thumb turn member, it has no provision for shifting the fence or lug 81 out of the path of the dogging device, so as to render the latter inoperative.

The operation of the improved lock will be more or less obvious from the foregoing description. In Fig. 1, the parts are in what may be termed the normal position, the latch bolt 20 being engaged with the movable part of the strike and the dead bolt 23 and its connected controller bolt 75 being in the retracted position. Supposing, now, that the guest desires to lock the room against intrusion, he protracts the dead bolt 23 by means of the thumb turn knob 27. The room is then locked against all keys excepting the emergency key. In the event that the proprietor or manager desires to gain access to the room, as in the case of accident or emergency, he can do so by inserting the key 44 in the keyhole 52 and operating the bolt 40 of the emergency or auxiliary lock in such a manner as to withdraw the movable strike member F from coöperation with all of the bolts, as hereinbefore described. The door may then be opened merely by pushing on the same, in spite of the protracted position of the bolts of the lock C. As soon as the emergency key is taken out of the auxiliary lock, the movable strike member F will immediately spring back to the operative or locking position under the influence of the spring acting on the bolt 40, and will be deadlocked in that position by means of the tumblers of said bolt. In order to lock the door again, the movable part of the strike may be held in the inoperative position by the emergency key, while the door is closed again with all of the bolts of the lock C in the protracted position, or if desired, the movable strike member may be permitted to move back to the operative or locking position, and then the door may be closed after the dead bolt (with its controller bolt) has been retracted, in which case the latch bolt will take into the strike in the usual manner.

Supposing, now, that the proprietor wishes to lock out the guest (e. g., in the case where his bill is unpaid) or that the guest has valuable goods in his room and wishes the proprietor to lock the room against opening by the ordinary keys, the proprietor will insert the shut-out or display key 67 in the keyhole 69, and the dead bolt 23 being in the locking position, he will actuate the bolt 59 of the auxiliary lock in such a manner as to push back the controller bolt 75 by means of the plunger 71, and thereby deadlock the dead bolt against withdrawal by means of the guest key 24, and other keys adapted to operate on the dead bolt tumblers. In this position, it will be impossible to gain entrance to the room by any key inserted into the keyhole 25 of the lock C, inasmuch as said key will be incapable of withdrawing the fence 81 out of coöperation with the dogging device 77, as previously explained. However, in case some one is in the room, he can render the dogging device 77 inoperative by actuating the thumb turn and thereby the fence 81, as hereinbefore explained. When the door is locked from the outside by means of the shut-out or display key 67, it may be opened by the proprietor at any time by means of the emergency key, although the guest key is inoperative. To accomplish this the emergency key is inserted in its keyhole and turned to withdraw the movable member of the strike, but before the bolt 40 begins to move, the tumblers 54 thereof, through the connecting slide 68, raise the tumblers 65 of the shut-out bolt 59 and permit the bolt 59 to move back to its initial position under the influence of a spring 59$^a$ acting on said bolt. This releases the lever 62 of the shut-out mechanism and permits the same to move back to the position shown in Fig. 4, so that the movable part of the strike may be readily withdrawn by the emergency key without interference by said member 62. In other words, the emergency key, on its initial movement, acts on the shut-out mechanism in such a manner as to prevent it from blocking the movement of the strike member F, and then on further movement of the emergency key in the keyhole, the movable strike member is completely withdrawn to release the door. When the lever 62 is released, as explained, the plunger 71 is pushed back into the strike member by the protraction of the controller bolt by its spring. This restores the dogging means for the dead bolt to its normal inoperative position.

In the particular lock illustrated, the emergency key and the shut-out key have different sets of tumblers, so that the shut-out key will not operate the mechanism for opening the door under all conditions, and the emergency key will not serve as a shut-out key, but, under some circumstances, it might be advisable to combine the emergency and shut-out functions in a single key. In this case, one key would operate both bolts of the auxiliary lock mechanism, or the equivalents of such bolts. However, in most cases, there will be an emergency key and a separate and different shut-out key, as described. By my improvements, the security factor is very largely increased, because the guest key for each room can have its own group of tumblers, to which it can be especially adapted in order to avoid all liability of picking, and because the emergency key and shut-out key of the series of locks can also have their own special sets of tumblers. Complications in the working of the lock mechanism are also avoided owing to the simplicity in the tumbler construction. Furthermore, it is much easier to differentiate between the keys so that no key will operate a lock which it is not intended to operate. The application of the auxiliary lock to the casing or frame of the door can be very readily effected, in the manner previously described, and the auxiliary lock can be applied to doors already in use, by removing the casing members of the door frame, and mounting the lock in the studding, and then re-applying the casing members.

I do not limit myself in all aspects of the invention to a construction in which the shut-out feature is applied to a lock on the door provided with a dead bolt, nor to a construction in which the auxiliary or controlling lock is mounted on the door frame in the particular manner herein described. Furthermore, I do not limit myself to a construction in which the strike is provided with a movable catch member, inasmuch as it might be practicable to make the whole strike bodily movable, or to adopt other variations. Various changes in these and other respects may be adopted within the scope of the invention as defined in the claims.

What I claim is:—

1. The combination with a door and door frame, of a bolt on the door for locking the latter to the frame, said bolt normally operable from the outside of the door, a lock mounted on the door frame, a key for said lock, and means movable into operative position by said key from the outside of the door for preventing the retraction of said bolt from the outside of the door; substantially as described.

2. The combination with a door and door frame, of a lock on the door for locking the latter to said frame, a second lock mounted on the frame, a key for releasing said first lock from the outside of the door, a key for said second lock, and means movable into operative position by said second key from the outside of the door for preventing the release of the door from the outside by the release of said first lock; substantially as described.

3. The combination with a door and door frame, of a lock on the door comprising a bolt for locking said door to the frame, a tumbler for said bolt, a key coöperating with said tumbler to retract the bolt, a second key insertible into a keyhole in the frame at the outside of the door, and means movable into operative position by said second key from the outside of the door to prevent the release of said bolt; substantially as described.

4. The combination with a door and door frame, of a lock on the door having a bolt for securing the door to the frame, a change key for retracting said bolt, tumbler-controlled shut-out mechanism on the door frame coöperating with said bolt, and a second and different key adapted to move the shut-out mechanism on the door frame into operative position with respect to said bolt from the outside of the door; substantially as described.

5. The combination with a door and door frame, of a lock on the door having a bolt for securing the door to the frame, a change key normally operable to retract said bolt, tumbler-controlled mechanism on the door frame to coöperate with said bolt, and a shut-out key for moving said tumbler-controlled mechanism into the operative position to thereby prevent the retraction of said bolt by said change key.

6. The combination with a door and door frame, of a lock on the door for locking the latter to said frame, a change key for said lock, and a shut-out key for said lock insertible into a keyhole on the door frame; substantially as described.

7. The combination with a door and door frame, of a lock on the door having a bolt, a keeper on the frame to receive said bolt, a change key operating in a key hole in the door and adapted to retract said bolt freely under normal conditions, tumbler-controlled shut-out mechanism for dogging said bolt against retraction from said keeper so as to render said change key inoperative, said tumbler-controlled mechanism including a bolt on the door frame, and a key adapted to act on said bolt to thereby move said tumbler-controlled mechanism into the operative position when it is desired to render the change key inoperative.

8. The combination with a door and door frame, of a lock on the door for locking the latter to the door frame, a key for said lock, a second key insertible into a keyhole on the door frame, an auxiliary lock housed in the door frame, and operable by said second key, and means operatively connected with said auxiliary lock and coöperating with the lock on the door to prevent the release of the door by means of said first-named key; substantially as described.

9. The combination with a door and door frame, of a bolt on the door, a strike on the door frame to engage said bolt, means for operating said bolt, means coöperating with said strike to prevent the operation of said bolt by said means, and a key for moving said preventing means to operative position, substantially as described.

10. The combination with a door and door frame, of a bolt on the door, a strike on the frame to engage said bolt, means for protracting and withdrawing said bolt, and a tumbler-controlled bolt mechanism associated with said strike and operable from the outside of the door for preventing the withdrawal of said bolt by said means; substantially as described.

11. The combination with a door and door frame, of a bolt on the door for locking the latter to said frame, means on the door frame for releasing the connection of the door with the frame by means of said bolt, and means on the door frame for preventing the release of the door from the frame by the withdrawal of said bolt from the outside; substantially as described.

12. The combination with a door and door frame, of a lock on the door for locking the latter to said frame, a change key for operating said lock, an emergency key, a shut-out key, means on the door frame actuated by said emergency key for releasing the bolted connection of the door and frame, and means on the frame actuated by said shut-out key for preventing the release of the door by said change key; substantially as described.

13. The combination with a door and door frame, of a bolt on the door for locking the latter to said frame, and means associated with said frame for releasing the bolted connection of said door with said frame, and for preventing the release of said door from said frame by the withdrawal of said bolt from the outside; substantially as described.

14. The combination with a door and door frame, of a bolt on the door for locking the latter to said frame, a key for operating said bolt, and means associated with the door frame for releasing the bolted connection of the door with the frame other than by the withdrawal of said bolt, and for preventing the release of the door from the frame by the withdrawal of said bolt from the outside; substantially as described.

15. The combination with a door and door frame, of a lock on said door, comprising a bolt, a strike on the frame to engage said bolt, a key for withdrawing said bolt, and key-operated means associated with the door frame for releasing the door from the frame, other than by the retraction of said bolt, and for preventing the retraction of said bolt by said first-named key; substantially as described.

16. The combination with a door and door frame, of a lock on the door comprising a bolt, a strike on the frame adapted to engage said bolt, a key for retracting said bolt, and key-actuated mechanism on the frame for releasing the door from the frame when said bolt is in protracted position, and for dogging said bolt against withdrawal by said first-named key; substantially as described.

17. The combination with a door and door frame, of a lock on the door for securing the latter to said frame, a key for said lock, and mechanism mounted on said door frame for rendering said key inoperative on said lock, said mechanism being operative to release the door independently of said key.

18. The combination with a door lock, of a change key for said lock operable in a keyhole in the door, and a shut-out key for said lock operable in a keyhole in the door frame; substantially as described.

19. An attachment for locks, comprising a strike having a movable member, means for operating said movable member, and a shut-out device coöperating with said strike; substantially as described.

20. An attachment for locks, comprising a strike having a movable member, key-actuated means for shifting the same, and a key-actuated shut-out device associated with said strike; substantially as described.

21. An attachment for locks, comprising a strike having a movable member, means for shifting said strike member, a shut-out device associated with said strike, and a key-actuated lock mechanism for operating said shifting means and said shut-out device; substantially as described.

22. An attachment for locks, comprising a movable strike member, means for shifting the same, a shut-out device associated with said movable strike member, lock mechanism for operating said shifting means and said shut-out device, and means for mounting said members on the door frame; substantially as described.

23. The combination with a door and door frame, of a lock on the door having a case and a bolt, a dogging device for said bolt in said case, a keeper on the frame to receive said bolt, a shut-out device on the frame to coöperate with said dogging device, and a key operating in a key hole on the frame for actuating said shut-out device to dog said bolt against retraction.

24. The combination with a door and door frame, of a lock on the door to lock the latter to said frame, a key for said lock, combined shut-out and emergency mechanism mounted on the frame, a key for operating said mechanism to prevent release of the lock by said first key, and a third key to operate said mechanism so as to release the lock independently of said first key.

25. The combination with a door and door frame, of a lock on the door having a dead bolt, a strike on the frame to coöperate with said dead bolt, and key-actuated means on the frame to release the door without withdrawing said dead bolt, and for preventing the release of the door by the withdrawal of said dead bolt from the outside; substantially as described.

26. The combination with a door and door frame, of a lock on the door having a bolt, a key to withdraw said bolt from the outside of the door, means to withdraw said bolt from the inside of the door, means on the frame to coöperate with said bolt in locking the door to the frame, and key-actuated mechanism mounted on the frame for releasing the door from the frame without retracting said bolt, and for preventing the withdrawal of said bolt by said key; substantially as described.

27. The combination with a door and door frame, of a lock on the door having a dead bolt, a key for protracting and retracting said dead bolt from the outside of the door, thumb-turn means for protracting and retracting said dead bolt from the inside of the door, means on the frame to coöperate with said bolt in locking the door to the frame, and key-actuated shut-out and emergency mechanism on the frame; substantially as described.

28. The combination with a door and door frame, of a lock on the door having a bolt, a strike on the frame to engage said bolt, a key for retracting said bolt from the outside of the door, means to retract said bolt from the inside of the door, key-actuated mechanism mounted on the frame for releasing the door from the frame without retracting said bolt, and for preventing the retraction of said bolt by said key, and means coöperating with said last-named means when the latter prevents the withdrawal of the bolt by said key, to permit the withdrawal of said bolt by said inside retracting means; substantially as described.

29. The combination with a door and door frame, of a lock on the door having a dead bolt, a key for protracting and retracting said dead bolt from the outside of the door, thumb-turn means for protracting and retracting said bolt from the inside of the door, and key-actuated means on the frame for releasing the connection of the door and the frame when said bolt is in its protracted position, and for preventing the withdrawal of said bolt by said first-named key, but not by said thumb-turn means; substantially as described.

30. The combination with a door and door frame, of a lock on the door having a dead bolt, a tumbler for said dead bolt, a key coöperating with said tumbler to actuate said dead bolt, means in said lock for dogging said dead bolt in its protracted position so that the key cannot retract the same, and means on the door frame for actuating said dogging means; substantially as described.

31. The combination with a door and door frame, of a lock on the door having a bolt, a key for actuating said bolt, means in said lock for dogging said bolt against retraction by said key, a projecting controller bolt for operating said dogging means, and key-actuated means on the door frame for operating said controller bolt; substantially as described.

32. The combination with a door having a locking bolt, of a door frame having a notch therein, a lock mounted in said notch, casing members inclosing said lock, a key insertible into the casing to actuate said lock, and a dogging device for said locking bolt operated by said lock; substantially as described.

33. The combination with a door having a locking bolt, of a door frame having a notch cut therein adjacent to the door, a lock mounted in said notch and comprising a bolt and one or more tumblers, casing members applied to the frame and inclosing said lock, a key insertible through one of said casing members to actuate the bolt of the lock in said notch, and a shut-out device operable by said last-named bolt; substantially as described.

34. An attachment for locks comprising a strike, lock mechanism associated with said strike, a key operative on said lock mechanism to dog a door bolt against retraction from said strike, and another key for actuating said lock mechanism to release the door independently of said first key.

35. The combination with a door and door frame, of a lock on the door having a bolt, a strike or keeper on the frame to receive said bolt, a shut-out device coöperating with the strike, and an emergency release device coöperating with the strike and operative independently of said shut-out device.

36. The combination with a door and door frame, of a lock on the door having a bolt, a key for retracting said bolt from the outside of the door, means for retracting said bolt from the inside of the door, a shut-out key, and means on the door frame actuated by said shut-out key to prevent the withdrawal of said bolt by said first-named key but not by said inside retracting means; substantially as described, 37. The combination with a door and door frame, of a lock on the door having a dead bolt, a key for protracting and retracting said dead bolt from the outside of the door, thumb turn means for protracting and retracting said bolt from the inside of the door, a shut-out key, means on the door frame actuated by said shut-out key to prevent the withdrawal of said bolt by said first-named key, and means actuated by said thumb turn means for rendering said preventing means inoperative; substantially as described.

38. The combination with a door and door frame, of a lock on the door having a casing and a bolt, a key insertible in a keyhole on the door for retracting said bolt, means in said casing to dog said bolt against retraction by said key, and controlling means for said dogging means located on the door frame; substantially as described.

39. The combination with a door and door frame, of a lock on the door having a case and a bolt therein, a key to retract said bolt, means including an auxiliary bolt for dogging said first bolt against retraction by said key, and a controlling member for said dogging mechanism located on the door frame and adapted to coöperate with said auxiliary bolt; substantially as described.

40. The combination with a door and door frame, of a lock on the door having a bolt, a movable strike or keeper member on the frame to receive said bolt, a change key operating in a key hole in the door for actuating said bolt, a shut-out device on the door frame coöperating with said movable strike member, and a key actuated means for controlling said movable strike member so as to release the door from the frame independently of said change key and said shut-out device.

41. The combination with a door and door frame, of a lock on the door having a bolt, a strike plate on the door having a movable member to coöperate with said bolt, a change key operating in a key hole in the door for actuating said bolt, a shut-out device on the door frame to prevent withdrawal of said bolt from said strike plate by said change key, tumbler-controlled mechanism operatively connected with said shut-out device, a shut-out key for operating said tumbler-controlled mechanism, a second tumbler-controlled mechanism operatively connected with said movable strike member to shift the same, and an emergency key to operate said last named tumbler-controlled mechanism to shift the movable strike member and thereby release the door from the frame independently of the other keys.

42. In a lock structure such as described, the combination of a door having a bolt, a strike adapted to be mounted on the door frame to receive said bolt and having a movable catch member to coöperate with said bolt, means controlling said movable catch member to release the door without the withdrawal of said bolt, and a key actuated shut-out device on the frame coöperating with said movable catch member and the bolt.

In witness whereof, I have hereunto set my hand on the 15th day of January, 1915.

HENRY G. VOIGHT.

Witnesses:
MARGARET QUINN,
RICHARD C. SARGENT.

Copies of this patent may be obtained for five cents each, by addressing the "Commissioner of Patents, Washington, D. C."